(12) United States Patent
Yamanaka

(10) Patent No.: US 9,718,362 B2
(45) Date of Patent: Aug. 1, 2017

(54) ELECTRIC VEHICLE

(71) Applicant: Kenshi Yamanaka, Nukata-gun (JP)

(72) Inventor: Kenshi Yamanaka, Nukata-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/767,023

(22) PCT Filed: Feb. 20, 2013

(86) PCT No.: PCT/JP2013/054139
§ 371 (c)(1),
(2) Date: Aug. 11, 2015

(87) PCT Pub. No.: WO2014/128855
PCT Pub. Date: Aug. 28, 2014

(65) Prior Publication Data
US 2015/0375622 A1    Dec. 31, 2015

(51) Int. Cl.
*B60K 1/00* (2006.01)
*B60L 3/00* (2006.01)
(Continued)

(52) U.S. Cl.
CPC .............. *B60L 3/0007* (2013.01); *B60K 1/00* (2013.01); *B60L 11/1877* (2013.01); *B60L 11/1881* (2013.01); *B60L 15/007* (2013.01); *B62D 21/152* (2013.01); *B62D 21/157* (2013.01); *B60K 2001/0416* (2013.01); *B60K 2001/0438* (2013.01); *B60L 2210/40* (2013.01); *B60Y 2306/01* (2013.01); *B60Y 2400/61* (2013.01);
(Continued)

(58) Field of Classification Search
CPC ....... B60K 1/00; B60L 3/0007; B60L 1/1877; B60L 1/1851; B60L 1/1881; B60L 15/007; B62D 21/152; B62D 21/107; B62D 21/155; B62D 21/157; B60Y 2306/01; B60Y 240/61
See application file for complete search history.

(56) References Cited

U.S. PATENT DOCUMENTS 5,106,148 A * 4/1992 Ikeda .................. B62D 25/084
                                                                 296/203.02
5,267,630 A * 12/1993 Watanabe ............ B60G 15/067
                                                                 180/297
(Continued)

FOREIGN PATENT DOCUMENTS

JP         7-101353         4/1995
JP         08-310252        11/1996
(Continued)

*Primary Examiner* — J. Allen Shriver, II
*Assistant Examiner* — Steve Clemmons
(74) *Attorney, Agent, or Firm* — Finnegan, Henderson, Farabow, Garrett & Dunner, LLP

(57) ABSTRACT

An electric vehicle disclosed by the present specification, includes an inverter arranged outside frame members in a vehicle width direction, in a front compartment. An inner side of the inverter in the vehicle width direction is fixed to one of the frame members. An outer side of the inverter in the vehicle width direction is fixed to a cabin outer plate. Furthermore, a fixation strength of the inner side of the inverter is lower than a fixation strength of the outer side of the inverter.

10 Claims, 6 Drawing Sheets

(51) Int. Cl.
   *B62D 21/15*   (2006.01)
   *B60L 11/18*   (2006.01)
   *B60L 15/00*   (2006.01)
   *B60K 1/04*    (2006.01)

(52) U.S. Cl.
   CPC .......... *Y02T 10/705* (2013.01); *Y02T 10/7241* (2013.01); *Y02T 90/34* (2013.01)

(56) References Cited

U.S. PATENT DOCUMENTS

| | | | | |
|---|---|---|---|---|
| 5,484,034 A * | 1/1996 | Benz | ...................... | B62D 27/06 180/294 |
| 7,802,643 B2 * | 9/2010 | Yajima | ...................... | B60K 6/22 180/271 |
| 8,037,960 B2 * | 10/2011 | Kiya | ...................... | B60K 1/04 180/68.5 |
| 8,051,934 B2 * | 11/2011 | Kiya | ...................... | B60K 1/04 180/274 |
| 8,336,657 B2 * | 12/2012 | Dobbins | ...................... | B60R 25/00 180/68.5 |
| 8,459,399 B2 * | 6/2013 | Ohashi | ...................... | 180/312 |
| 8,616,319 B2 * | 12/2013 | Yokoyama | ...................... | B60K 1/04 180/68.5 |
| 8,698,347 B2 * | 4/2014 | Ishigaki | ...................... | B60L 3/0007 307/10.1 |
| 8,830,686 B2 * | 9/2014 | Nomoto | ...................... | H05K 5/0073 361/752 |
| 2005/0006168 A1 | 1/2005 | Iwasaka et al. | | |
| 2005/0205316 A1 * | 9/2005 | Yamafuji | ...................... | B60R 16/04 180/68.5 |
| 2006/0201753 A1 * | 9/2006 | Yamafuji | ...................... | B60K 1/00 188/65.1 |
| 2008/0023986 A1 * | 1/2008 | Regnell | ...................... | B62D 33/077 296/182.1 |
| 2008/0149410 A1 * | 6/2008 | Yang | ...................... | B60K 1/04 180/291 |
| 2015/0274013 A1 * | 10/2015 | Matsuda | ...................... | B60L 11/1864 180/242 |
| 2015/0375622 A1 * | 12/2015 | Yamanaka | ...................... | B60K 1/00 180/65.1 |

FOREIGN PATENT DOCUMENTS

| | | | |
|---|---|---|---|
| JP | 2000108935 A * | 4/2000 | |
| JP | 2001-97052 | 4/2001 | |
| JP | 2002225750 A * | 8/2002 | |
| JP | 2004-175301 | 6/2004 | |
| JP | 2005-29057 | 2/2005 | |
| JP | 2005186761 A * | 7/2005 | |
| JP | 2005-262894 | 9/2005 | |
| JP | 2007-161111 | 6/2007 | |

* cited by examiner

ELECTRIC VEHICLE

CROSS-REFERENCE TO RELATED APPLICATIONS

This application is a national phase application of International Application No. PCT/JP2013/054139, filed Feb. 20, 2013, the content of which is incorporated herein by reference.

TECHNICAL FIELD

The invention relates to an electric vehicle. In particular, the invention relates to a mounting structure of an inverter that converts a direct-current electric power of a battery into an alternating-current electric power and that supplies this alternating-current electric power to a motor in an electric vehicle. "The electric vehicle" in the present specification includes a fuel-cell vehicle and a hybrid vehicle equipped with an engine as well as a motor.

BACKGROUND ART

There are two types of vehicle body structures, that is, a monocoque structure and a frame structure. The monocoque structure imparts a structural strength by a plate material. The frame structure imparts a structural strength by a frame as a combination of beams. A motor vehicle of the frame structure has two beams extending in a longitudinal direction, as main members that impart a structural strength. The beams are referred to as side members or side frames. The two side members are main members of the frame. The two side frames are coupled to each other by an auxiliary beam extending in a vehicle width direction.

Main components of a drive train are arranged between the two side members in a front compartment, because a space between the two side members is suited to protect devices from an impact. A motor vehicle with an engine arranged between two side members is disclosed in, for example, Japanese Patent Application Publication No. 2005-029057 (JP 2005-029057 A). Japanese Patent Application Publication No. 2004-175301 (JP 2004-175301 A) discloses an electric vehicle with the arrangement of an inverter improved. In the electric vehicle, a battery and the inverter, which converts a direct-current electric power of the battery into an alternating-current electric power to supply this alternating-current electric power to a motor, are arranged between two side members. Incidentally, in addition, the following art is disclosed in Japanese Patent Application Publication No. 2005-262894 (JP 2005-262894 A) as an art of protecting an inverter from an impact of a collision. According to the art, the inverter is fixed to a frame member by a clasp referred to as a bracket. A power cable is fixed to the bracket. The power cable is a cable that connects the inverter and the motor to each other, and is a component that is to be protected from an impact due to the flow of a large current therethrough. Upon receiving an impact, the bracket is also deformed as the frame member is deformed. For this reason, the amount of relative displacement of the inverter and the bracket is small. Therefore, the possibility of rupture of the power cable can be reduced.

SUMMARY OF THE INVENTION

It is preferable that important devices be arranged between the two side members. In this case, however, the degree of freedom in arranging the devices is low. The present specification provides an art of effectively using a space of a front compartment of an electric vehicle. In the electric vehicle disclosed by the present specification, an inverter is arranged outside frame members in a vehicle width direction, in a front compartment. Therefore, other devices can be arranged in a space between the two frame members. It should be noted herein that "the frame members" are a type of frame members of the vehicle as described above, and extend in a longitudinal direction of the vehicle. Besides, "the outside of the frame members in the vehicle width direction" means a side that is further away from a center of the vehicle in the vehicle width direction than the frame members. Besides, "the arrangement of the inverter outside the frame members" does not necessarily mean that the entire inverter is located outside the frame members. At least half of the inverter may be arranged outside the frame members. Then, another device equivalent to half the volume of the inverter can be arranged between the two frame members.

The inverter may be preferably fixed in the following mode. An inner side of the inverter in the vehicle width direction is fixed to one of the frame members. An outer side of the inverter in the vehicle width direction is fixed to a cabin outer plate. "The cabin outer plate" is a shell-like metal plate that defines a cabin. Furthermore, it is appropriate that the inverter be arranged above or below the frame members, and that a fixation strength of the inner side of the inverter be lower than a fixation strength of the outer side of the inverter. By making the fixation strengths different from each other, the fixation between the frame member and the inverter is first released upon reception of an impact diagonally from in front, so the inverter is freed from the frame member. On the other hand, the inverter is linked with the cabin outer plate. Therefore, upon receiving an impact, the inverter can move as the cabin outer plate is deformed. The impact received by the inverter is mitigated through the movement of the inverter.

While the frame members are made of high-rigidity iron, the cabin outer plate is made from a steel plate, so the material of the frame members exhibits higher rigidity than the material of the cabin outer plate. Therefore, with a view to making the fixation strength between the inverter and the frame member lower than the fixation strength between the inverter and the cabin outer plate, it is appropriate to adopt, for example, a bracket that is more likely to be disengaged (more likely to be ruptured) than in the case of direct fixation by a bolt.

As described above, the degree of freedom in laying out the devices in the front compartment can be enhanced by arranging the inverter outside the two frame members (outside in the vehicle width direction). Besides, the inner side of the inverter is fixed to one of the frame members, and the outer side of the inverter is fixed to the cabin outer plate. Also, the fixation strength of the inner side is made lower than the fixation strength of the outer side. Thus, upon receiving an impact diagonally from in front of the vehicle, the inverter is freed from the frame member, but remains coupled to the cabin outer plate. The inverter is allowed to move to a moderate degree, so the impact can be mitigated.

In the aforementioned structure, the inner side of the inverter in the vehicle width direction is fixed to one of the frame members. The advantage of the structure can also be obtained from the following structure. That is, both the inner and outer sides of the inverter in the vehicle width direction are fixed to the cabin outer plate, and the cabin outer plate is fixed to one of the frame members inside the inverter in the vehicle width direction. Then, the fixation strength of the outer side of the inverter in the vehicle width direction is made higher than the fixation strength of the inner side of the inverter in the vehicle width direction or the fixation strength between the cabin outer plate and the frame member. In such a structure as well, upon receiving an impact diagonally from in front of the vehicle, the inverter is freed from the frame member, but remains coupled to the cabin outer plate. The inverter is allowed to move to a moderate degree, so the impact can be mitigated.

The details of the art disclosed by the present specification and further improvements thereof will be described subsequently with reference to embodiments of the invention.

MODES FOR CARRYING OUT THE INVENTION

Some preferred features of the art described in the embodiments of the invention will be listed below as to an attaching structure of an inverter.

(1) The inverter is located above a frame member.
(2) The inverter is arranged on a fender apron.
(3) The inverter is arranged behind a center of a front compartment in a longitudinal direction.

EMBODIMENTS

First Embodiment

Figure 1:
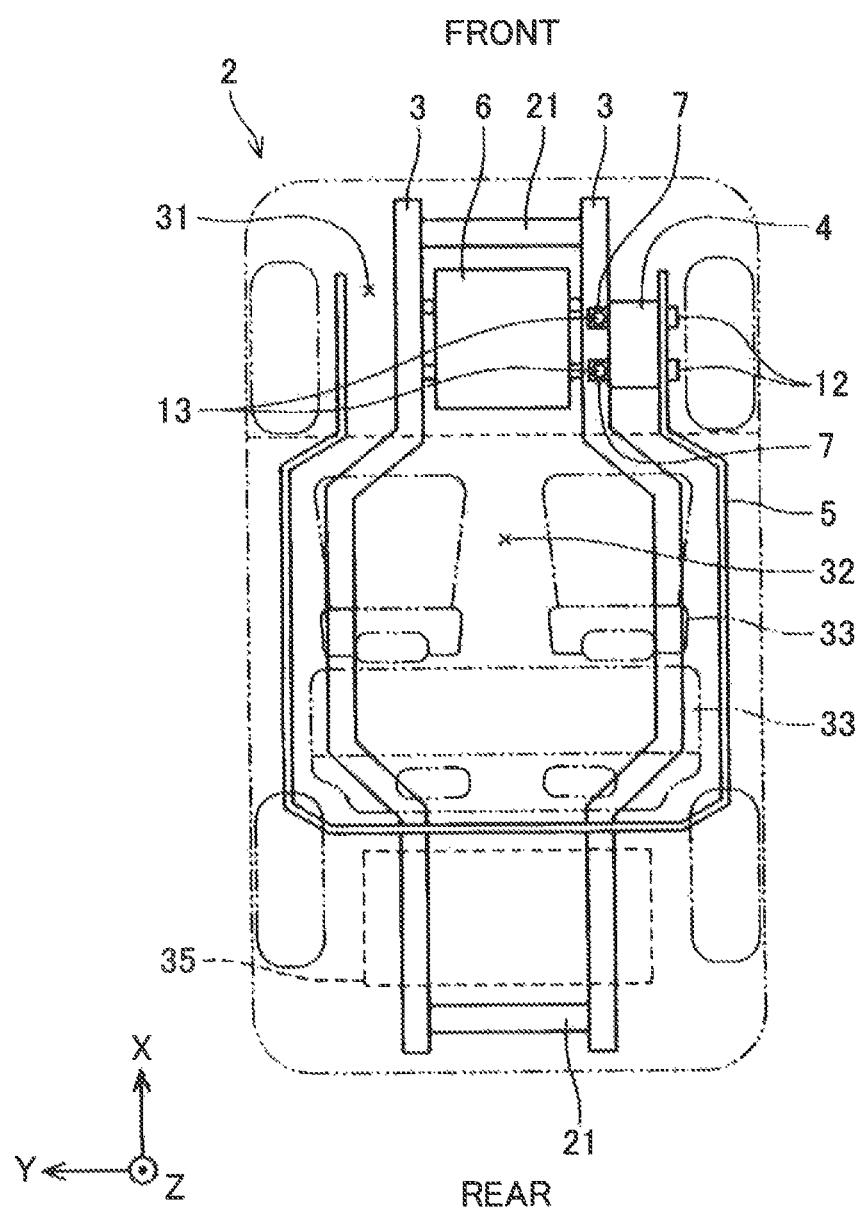
FIG. 1 is a plan view of an electric vehicle according to the first embodiment of the invention.
Figure 2:
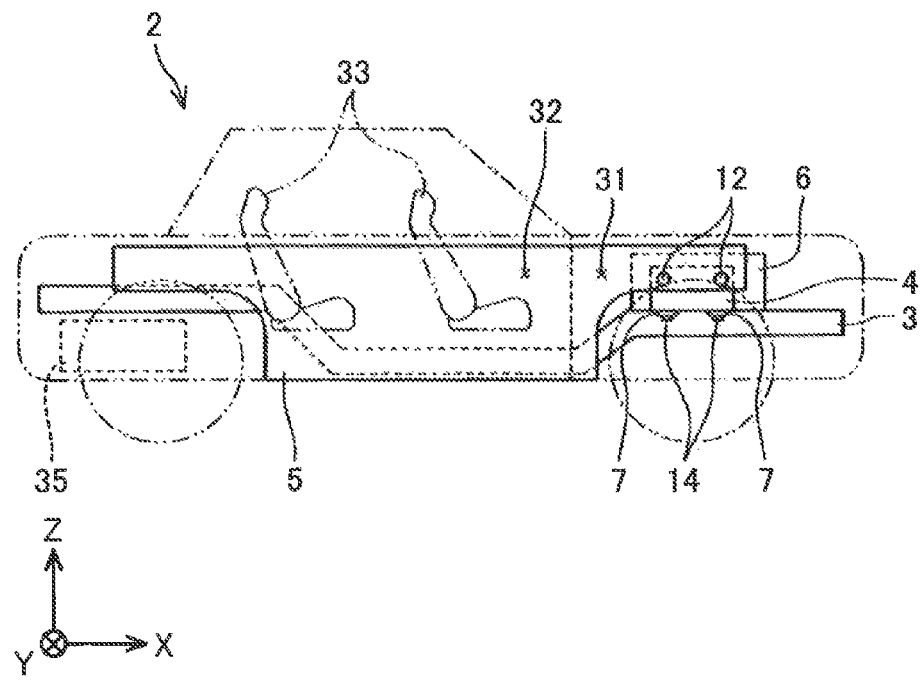
FIG. 2 is a lateral view of the electric vehicle.
Figure 3:
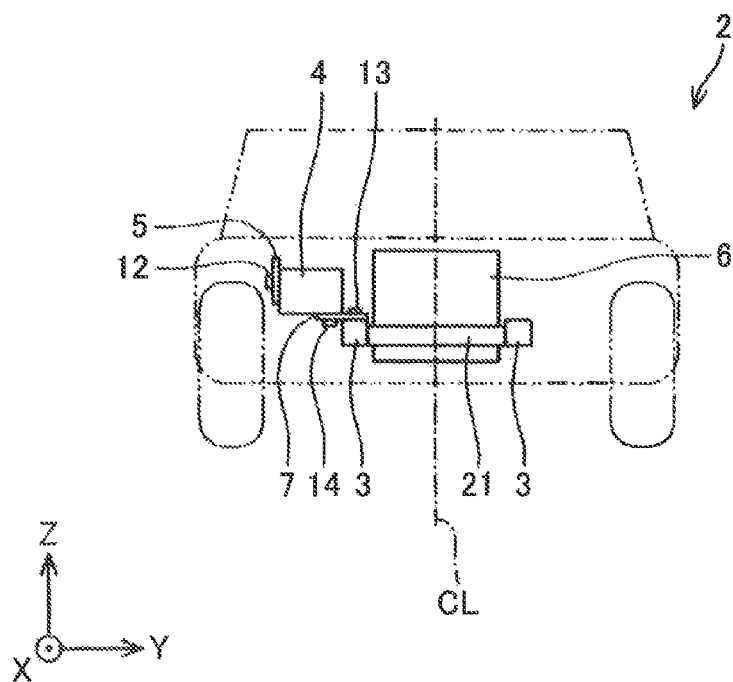
FIG. 3 is a front view of the electric vehicle.

FIGS. 1 to 3 are plan, lateral and front views showing the electric vehicle according to the first embodiment of the invention, respectively. Incidentally, a relationship among frame members of the vehicle, a cabin outer plate, and the inverter will be described herein, so the diagrammatic representation and description of other components will be arbitrarily omitted.

A front compartment 31 of an electric vehicle 2 is mounted with a traction motor 6 and an inverter 4. The inverter 4 converts a direct-current electric power of a battery 35, which is arranged in a luggage space in a rear part of the vehicle, into an alternating-current electric power, and supplies this alternating-current electric power to the motor 6. A large alternating current is supplied from the inverter 4 to the motor 6, so the inverter 4 is arranged close to the motor 6 with a view to reducing the transmission loss in electric power. Therefore, both the motor 6 and the inverter 4 are mounted in the front compartment.

The electric vehicle 2 has a frame structure. Two side members 3 are main components of a frame (frame members). The two side members 3 mainly impart a structural strength to the electric vehicle 2. The two side members 3 extend parallel to a longitudinal direction of the vehicle, and are coupled to each other by a plurality of cross members 21 that extend in a vehicle width direction. The motor 6 is arranged between the two side members 3. The motor 6 is fixed to the cross members 21. The motor 6 is arranged between the two high-strength side members 3. In the event of a collision of the vehicle, the side members 3 protect the motor 6.

The inverter 4 is arranged outside the side members 3 in the vehicle width direction instead of being arranged between the two side members 3. It should be noted, however, that the inverter 4 is fixed to one of the side members 3 via a bracket 7 by bolts 13 and 14. The bracket 7 is a clasp for attaching the inverter 4 to the side member 3, and is made from a metal plate.

Besides, the inverter 4 is also fixed to a cabin outer plate 5. The cabin outer plate 5 is a structure that defines a cabin (a boarding space 32), and is mainly made from a metal plate. Incidentally, a reference numeral 33 in the drawings denotes a seat in which a passenger is seated. The seat 33 is arranged in the cabin space 32.

As well shown in FIGS. 1 and 3, the inverter 4 is fixed to the side member 3 via the bracket 7 inside in the vehicle width direction, and is fixed to the cabin outer plate 5 outside in the vehicle width direction. Incidentally, a straight line CL indicates a vehicle center in the vehicle width direction in FIG. 3. Accordingly, the inside in the vehicle width direction means a side that is closer to a centerline CL than the side members 3, and the outside in the vehicle width direction means a side that is further away from the centerline CL than the side members 3. Besides, in FIG. 3, the cabin outer plate 5 is depicted only in the vicinity of the inverter 4, and the other part of the cabin outer plate 5 is not shown.

The bracket 7 is structured such that the inverter 4 is disengaged when a load of a predetermined magnitude is applied thereto. It should be noted herein that "the load of the predetermined magnitude" is a value lower than a fixation strength between the cabin outer plate 5 and the inverter 4. Besides, the fixation strength of the bracket 7 is adjusted such that the inverter 4 is disengaged from the side member 3 when an assumed collision impact is applied thereto. Conversely, the fixation strength between the cabin outer plate 5 and the inverter 4 is adjusted such that the assumed collision impact can be tolerated.

Figure 4:
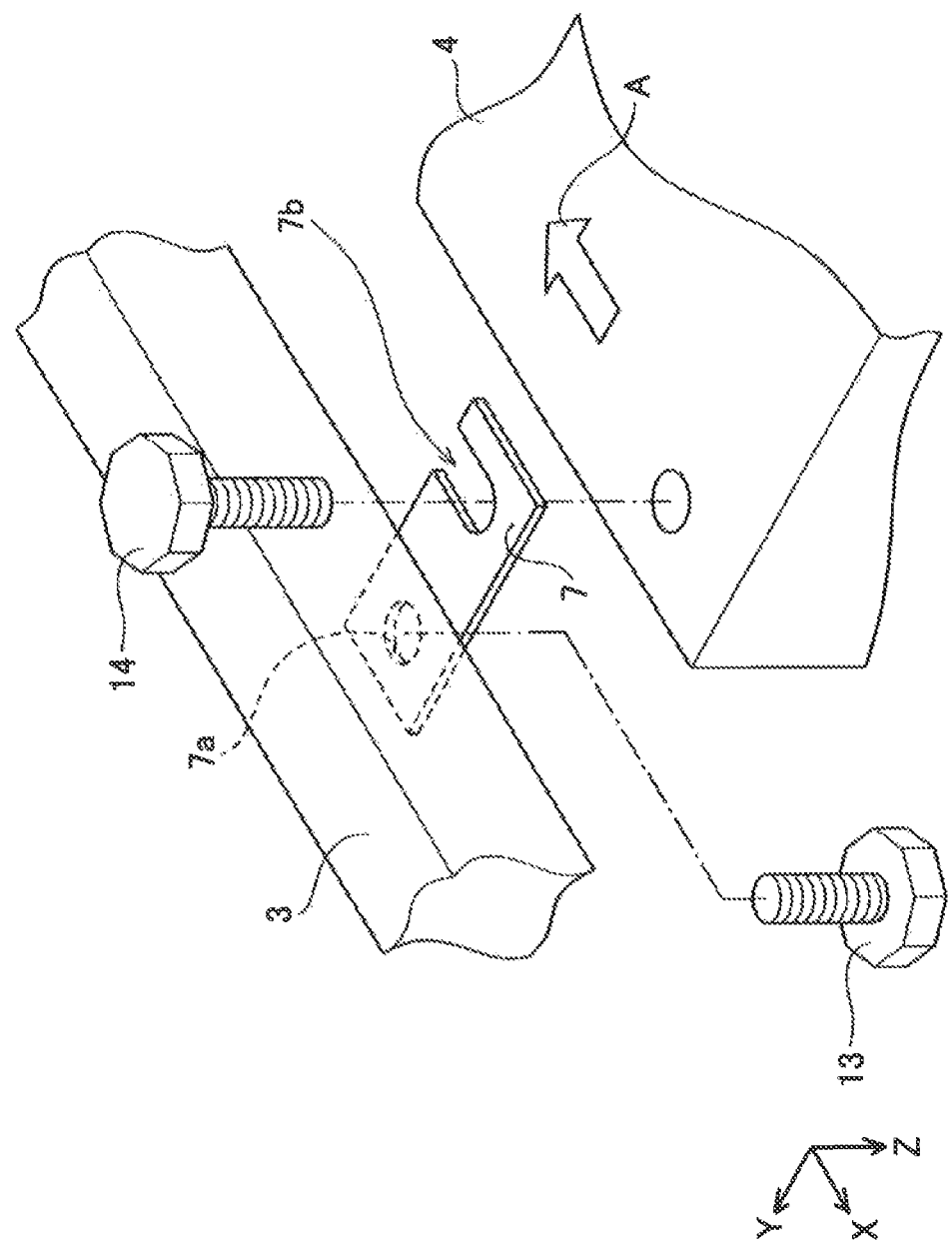
FIG. 4 is an enlarged perspective view of a location where a side member and an inverter are fixed to each other.

FIG. 4 shows an exemplary structure of the bracket 7. It should be noted that the depiction is vertically inversed in FIG. 4 (see a coordinate system in the drawing). The bracket 7 has a through-hole 7a and a slit 7b. The bracket 7 is fixed to the side member 3 through the through-hole 7a by the bolt 13. On the other hand, the bracket 7 is fixed to the inverter 4 through the slit 7b by the bolt 14. A negative direction in an X-axis of FIG. 4 is equivalent to a backward direction with respect to the vehicle. The slit 7b opens backward with respect to the vehicle. Therefore, when the load of the predetermined magnitude is applied to the inverter 4 backward with respect to the vehicle (in a direction indicated by an arrow A in FIG. 4), the inverter 4 is disengaged from the bracket 7, namely, from the side member 3.

Figure 5:
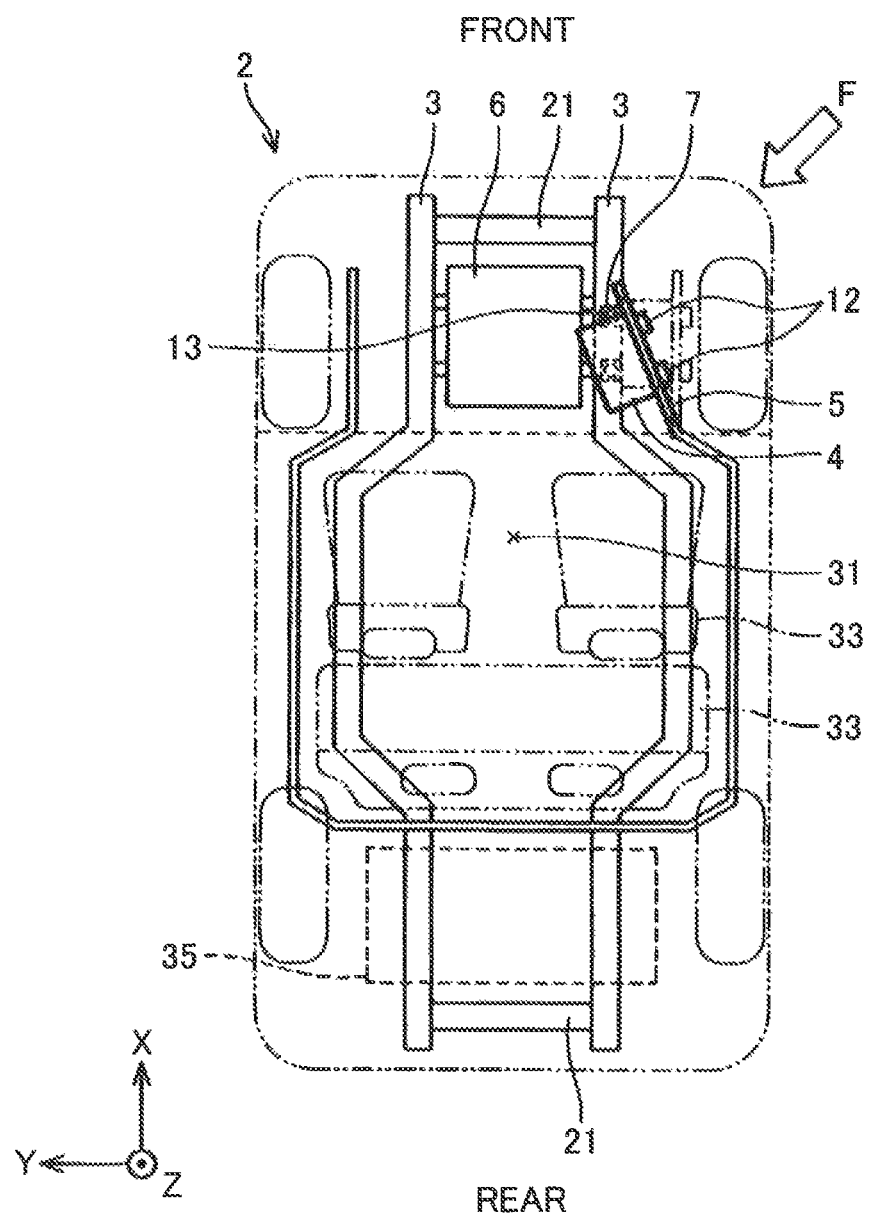
FIG. 5 is a plan view showing an exemplary movement of the inverter upon reception of an impact diagonally from in front.

Advantages of the aforementioned structure of the bracket 7 will be described. FIG. 5 is a plan view of the same electric vehicle 2 as in FIG. 1. An arrow denoted by a reference symbol F represents an impact that the electric vehicle 2 receives from right in front. Thick lines indicate deformation of the cabin outer plate 5 upon reception of an impact, and the movement of the inverter 4. Upon receiving an impact from right in front, a front-right portion of the cabin outer plate 5 bends leftward and backward. The outer side of the inverter 4 is fixed to the cabin outer plate 5, and the inner side of the inverter 4 is fixed to the side member 3. However, when the collision load applied backward exceeds the predetermined magnitude, the inverter 4 is disengaged from the bracket 7 to be freed from the side member 3. Therefore, the inverter 4 moves leftward and backward as the cabin outer plate 5 is deformed. Incidentally, as shown in FIGS. 2 and 3, the inverter 4 is located above the side members 3. Accordingly, the inverter 4 can move leftward and backward without interfering with the side members 3. Upon receiving an impact, the inverter 4 is released from being fixed to the side member 3, and moves backward. The received impact is mitigated through the movement of the inverter 4.

In the aforementioned structure, the inverter 4 is arranged outside the two side members 3. Therefore, other important devices can be arranged in a space between the side members 3. The electric vehicle 2 according to the embodiment of the invention is advantageous in that the degree of freedom in laying out the devices in the front compartment is high.

Second Embodiment

Figure 6:
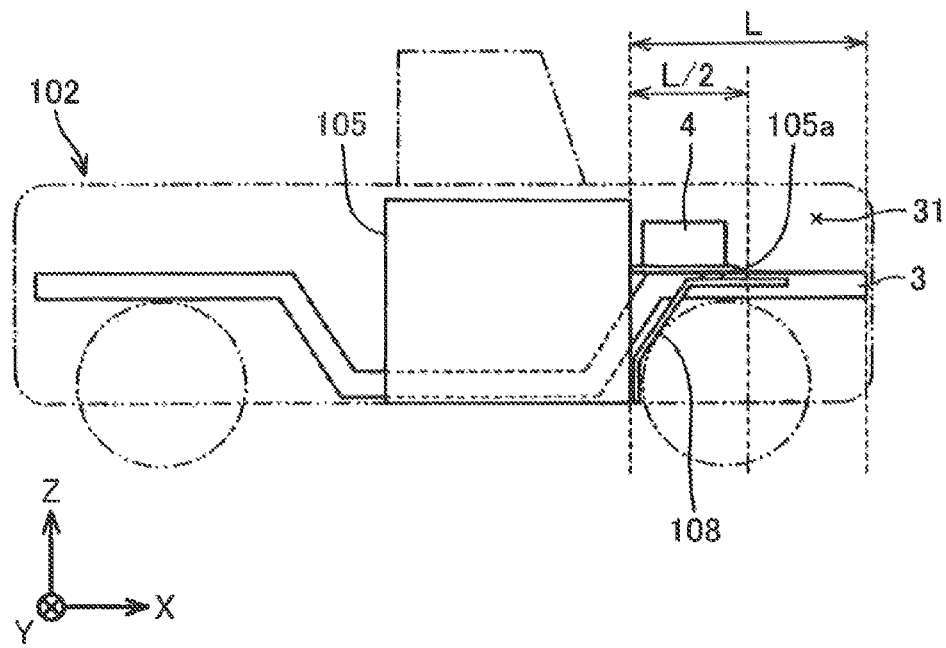
FIG. 6 is a lateral view of an electric vehicle according to the second embodiment of the invention.
Figure 7:
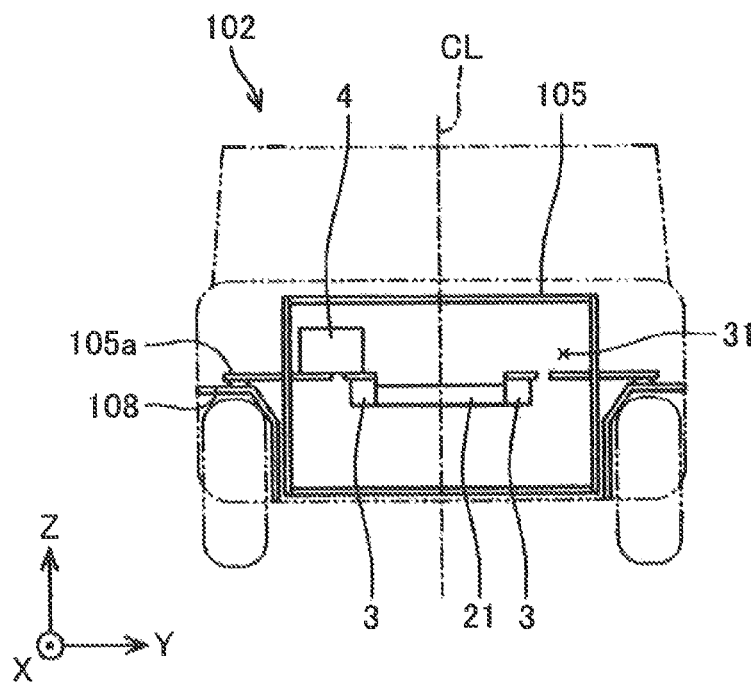
FIG. 7 is a front view of the electric vehicle according to the second embodiment of the invention.

Next, the electric vehicle according to the second embodiment of the invention will be described. FIG. 6 is a lateral view showing an electric vehicle 102 according to the second embodiment of the invention. FIG. 7 is a front view showing the electric vehicle 102. The diagrammatic representation of a motor is also omitted in FIGS. 6 and 7. The electric vehicle 102 according to this second embodiment of the invention is an example in which the aforementioned attaching structure of the inverter is applied to a large-sized vehicle such as a pickup truck. In the case of a large-sized vehicle, the space of the front compartment 31 is high, and the space above front wheels is wide. In such a case, it is appropriate that the inverter 4 be arranged behind the center of the front compartment 31 in the longitudinal direction. A reference symbol L in FIG. 6 denotes the length of the front compartment 31 in the longitudinal direction. The inverter 4 is arranged in a posterior half range (a range indicated by L/2 in the drawing) of the front compartment 31. By arranging the inverter 4 behind in the front compartment, the impact received by the inverter 4 in the event of a collision of the vehicle can be reduced.

Besides, when there is a space above the front wheels, it is appropriate that the inverter 4 be fixed to an upper portion of a fender apron 105a. The fender apron 105a constitutes part of a cabin outer plate 105, and is a location to which a front fender 108 is attached.

Third Embodiment

Figure 8:
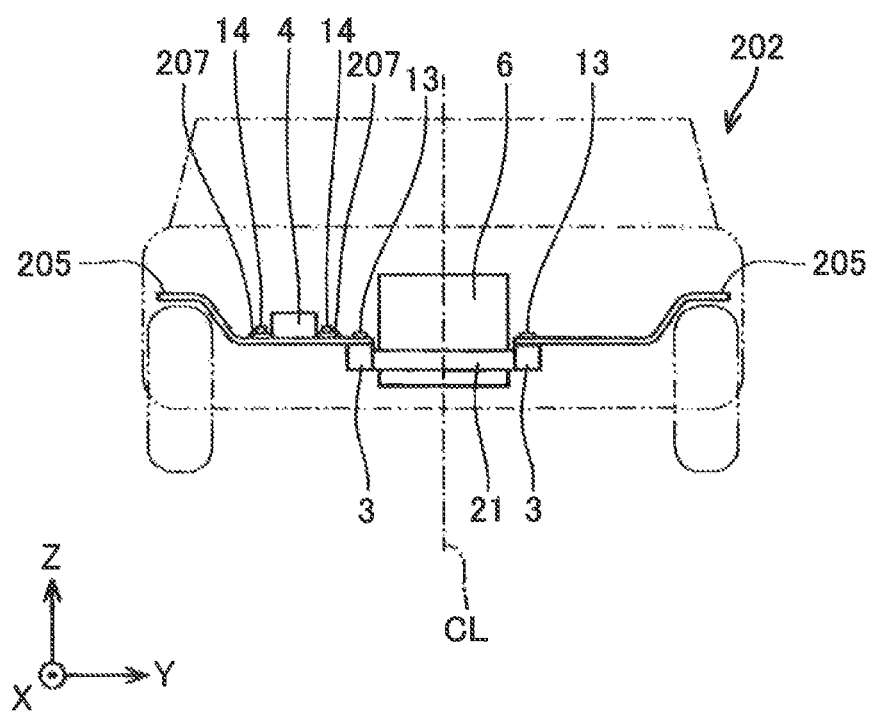
FIG. 8 is a front view of an electric vehicle according to the third embodiment of the invention.

Next, the electric vehicle according to the third embodiment of the invention will be described. FIG. 8 is a front view showing an electric vehicle 202 according to the third embodiment of the invention. The third embodiment of the invention is a modification example of the fixing structure of the inverter in the electric vehicle 2 according to the first embodiment of the invention. An inner side of the inverter 4 in the vehicle width direction, and an outer side of the inverter 4 in the vehicle width direction are fixed to a cabin outer plate 205. More specifically, the inner side of the inverter 4 and the outer side of the inverter 4 are fixed to the cabin outer plate 205 via brackets 207 by the bolts 14. The brackets are clasps for fixing an object. In this case, the brackets 207 are clasps for fixing the inverter 4 to the cabin outer plate 205.

The cabin outer plate 205 is fixed to the side member 3 by the bolt 13, inside the inverter 4 in the vehicle width direction (on a side close to the centerline CL). Then, the fixation strength between the cabin outer plate 205 and the side member 3 is lower than the fixation strength of the outer side of the inverter 4 in the vehicle width direction. The fixation strength of the outer side of the inverter 4 in the vehicle width direction is adjusted such that an assumed collision impact can be tolerated. The fixation strength between the cabin outer plate 205 and the side member 3 is adjusted such that the cabin outer plate 205 and the side member 3 are disengaged from each other when the assumed collision impact is applied thereto.

The same effect as in the electric vehicles according to the first and second embodiments of the invention is obtained from the structure of the third embodiment of the invention as well. That is, when the inverter 4 receives an impact, the cabin outer plate 205 and the side member 3 are released from being fixed to each other, so the inverter 4 is freed from the side member. As a result, the inverter 4 moves backward in accordance with the impact. The received impact is mitigated through the movement of the inverter 4.

Incidentally, in the third embodiment of the invention, the fixation strength between the cabin outer plate 205 and the side member 3 is lower than the fixation strength of the outer side of the inverter 4 in the vehicle width direction. The same advantage is also obtained by making the fixation strength of the inner side of the inverter 4 in the vehicle width direction lower than the fixation strength of the outer side of the inverter 4 in the vehicle width direction, instead of establishing such a relationship between the fixation strengths.

In order to realize different fixation strengths, the bracket 7 exemplified in the first embodiment of the invention may be used. Different fixation strengths can also be realized by changing the diameters of the bolts for fixing the inverter. Concretely, a small-diameter bolt may be used to fix the outer side of the inverter in the vehicle width direction, and a large-diameter bolt may be utilized to fix the inner side of the inverter in the vehicle width direction, or to fix the cabin outer plate 205 and the side member 3 to each other.

The points to remember about the art described in the embodiments of the invention will be mentioned. The side members 3 extending in the longitudinal direction of the vehicle are equivalent to an example of the frame members.

The representative and nonrestrictive concrete examples of the invention have been described in detail with reference to the drawings. This detailed description is simply intended to inform those skilled in the art of the details for carrying out preferred examples of the invention, and is not intended to limit the scope of the invention. Besides, the disclosed additional features and inventions can be used separately from or in combination with other features and inventions, in order to provide a further improved electric vehicle.

Besides, the features and combinations of processes disclosed in the aforementioned detailed description are not indispensable in the broadest sense in carrying out the invention, but are described for the sole purpose of explaining the representative concrete examples of the invention in particular. Furthermore, various features of the aforementioned representative concrete examples and various features of what is described in the independent and dependent claims are not required to be combined with one another as in the concrete examples described herein or according to the sequence of enumeration in providing additional and effective embodiments of the invention.

All the features described in the present specification and/or the claims are intended to be disclosed individually and independently of one another as limitations on the contents disclosed at the time of the filing of the application and the specific matters described in the claims, separately from the configurations of the features described in the embodiments of the invention and/or the claims. Furthermore, all the numerical ranges and groups or aggregations are described as limitations on the contents disclosed at the time of the filing of the application and the specific matters described in the claims, with the intention of disclosing intermediate configurations thereof.

Although the concrete examples of the invention have been described above in detail, these are nothing more than exemplifications, and should not limit the claims. The art described in the claims includes those obtained by modifying and altering the concrete examples exemplified above in various manners. The technical elements described in the present specification or the drawings are technically useful alone or in various combinations, and should not be limited to the combinations described in the claims at the time of the filing of the application. Besides, the art exemplified in the present specification or the drawings can achieve a plurality of objects at the same time, and is technically useful by achieving one of the objects itself.

DESCRIPTION OF REFERENCE NUMERALS 2, 102, 202 ELECTRIC VEHICLE
3 SIDE MEMBER
4 INVERTER
5, 105, 205 CABIN OUTER PLATE
6 MOTOR
7, 207 BRACKET
7a THROUGH-HOLE
7b SLIT
21 CROSS MEMBER
31 FRONT COMPARTMENT
32 CABIN SPACE
105a FENDER APRON
108 FRONT FENDER
CL CENTERLINE

The invention claimed is:

1. An electric vehicle comprising:
a traction motor;
two frame members that extend in a longitudinal direction of the vehicle;
an inverter configured to supply an alternating-current electric power to the traction motor, the inverter being arranged outside the two frame members, in a vehicle width direction, in a front compartment of the vehicle;
a cabin outer plate fixed to an outer side of the inverter in the vehicle width direction; and
a bracket configured to fix an inner side of the inverter in the vehicle width direction to one of the two frame members,
wherein the bracket includes a through-hole configured to receive a first bolt for fixing the bracket to a top portion of the one of the two frame members, and a slit configured to receive a second bolt for fixing the bracket to a bottom portion of the inverter, such that a fixation strength of the inner side of the inverter is lower than a fixation strength of the outer side of the inverter.

2. The electric vehicle according to claim 1, wherein the inverter is located above the two frame members.

3. The electric vehicle according to claim 1, wherein the inverter is arranged on a fender apron.

4. The electric vehicle according to claim 1, wherein the inverter is arranged behind a center of the front compartment in the longitudinal direction.

5. The electric vehicle according to claim 1, wherein the slit opens rearwards with respect to a front-rear direction of the vehicle.

6. An electric vehicle comprising:
a traction motor;
two frame members that extend in a longitudinal direction of the vehicle;
an inverter configured to supply an alternating-current electric power to the traction motor, the inverter being arranged outside the two frame members, in a vehicle width direction, in a front compartment of the vehicle;
a cabin outer plate fixed to an inner side of the inverter in the vehicle width direction and an outer side of the inverter in the vehicle width direction; and
a bracket configured to fix the cabin outer plate to a top portion of one of the two frame members inside the inverter in the vehicle width direction,
wherein the bracket includes a through-hole configured to receive a first bolt for fixing the bracket to a top portion of the cabin outer plate, and a slit configured to receive a second bolt for fixing the bracket to a bottom portion of the inverter, such that a fixation strength of the outer side of the inverter in the vehicle width direction is higher than a fixation strength of the inner side of the inverter or a fixation strength between the cabin outer plate and the one of the two frame members.

7. The electric vehicle according to claim 6, wherein the inverter is located above the two frame members.

8. The electric vehicle according to claim 6, wherein the inverter is arranged on a fender apron.

9. The electric vehicle according to claim 6, wherein the inverter is arranged behind a center of the front compartment in the longitudinal direction.

10. The electric vehicle according to claim 6, wherein the slit opens rearwards with respect to a front-rear direction of the vehicle.

* * * * *